Nov. 8, 1960     J. S. FINGER     2,959,511

DECORATIVE SURFACE THERMOSETTING PLASTICS

Filed Jan. 21, 1955     3 Sheets—Sheet 1

INVENTOR.
Joseph S. Finger
BY Nobbe & Swope
ATTORNEYS

Nov. 8, 1960    J. S. FINGER    2,959,511
DECORATIVE SURFACE THERMOSETTING PLASTICS
Filed Jan. 21, 1955    3 Sheets-Sheet 3
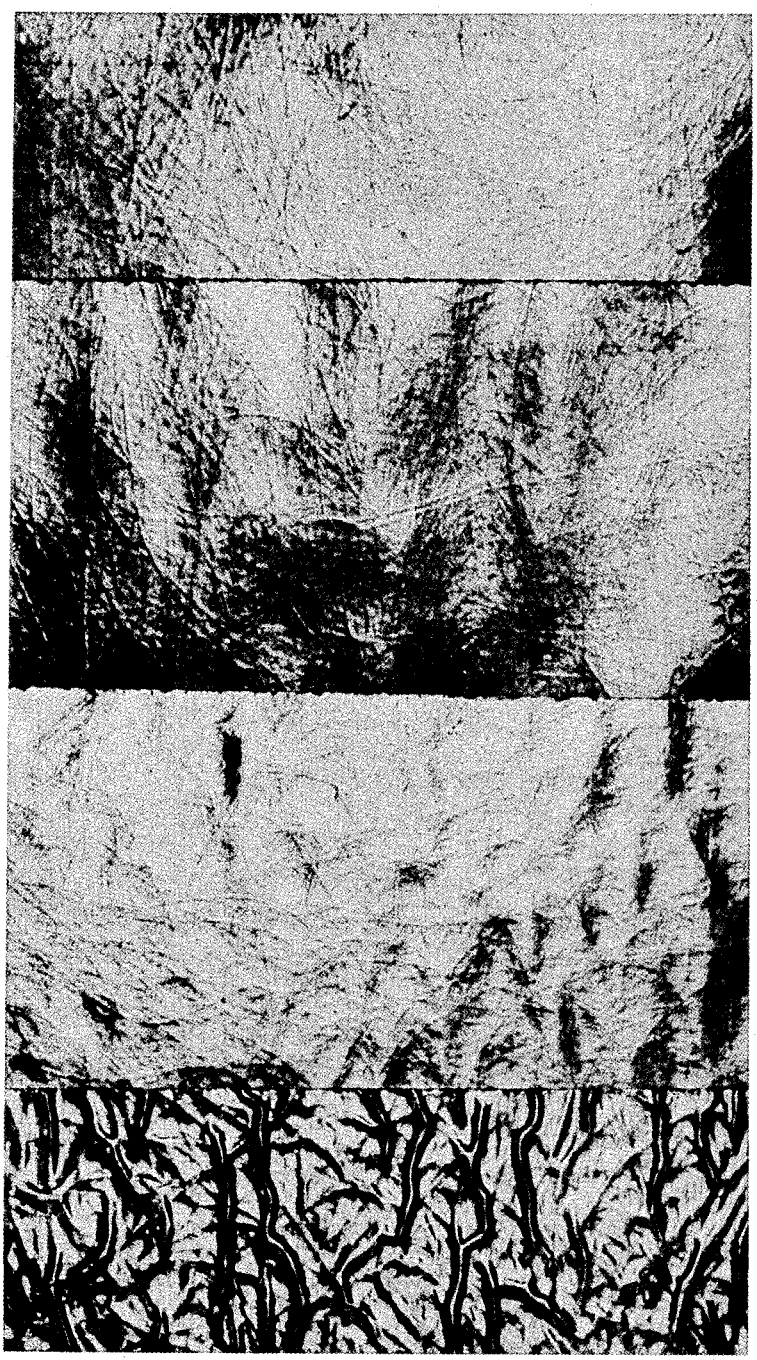
INVENTOR
Joseph S. Finger
BY Nobbe & Swope
ATTORNEYS

2,959,511

DECORATIVE SURFACE THERMOSETTING PLASTICS

Joseph S. Finger, Houston, Tex., assignor, by mesne assignments, to Johns-Manville Fiber Glass Inc., Cleveland, Ohio, a corporation of Delaware Filed Jan. 21, 1955, Ser. No. 483,381

5 Claims. (Cl. 154—106)

This invention relates to synthetic resin articles of manufacture and to methods of making the same. In a more specific aspect this invention relates to synthetic resin panels having novel decorative surfaces and to methods of producing the same.

The present application is a continuation-in-part of application Serial No. 227,444, filed May 21, 1951, and entitled Decorative Surface Thermosetting Plastics, now abandoned.

Various thermosetting resins, such as the polyesters, polyester-styrene blends, phenol-formaldehyde, alkyds and the like, shrink or contract on congealing from their plastic or fluid state to a solid form. Such shrinkage or contraction occurs either where a filler such as glass fibers is incorporated in the resin, or where the filler is omitted. Conventionally, in producing reinforced thermosetting resin panels for various strucutral uses, such as for skylights, paneling, awnings, wall and ceiling elements and the like, a thin film, such as regenerated cellulose (known in the trade as "cellophane"), is placed on opposite surfaces of a layer of liquid thermosetting resin having a reinforcing filler incorporated therein, and the wet lay-up so formed is placed on a suitable mold and cured. By this procedure, a smooth finish is produced on opposite surfaces of the cured product inasmuch as the cellulose film shrinks to substantially the same degree as does the resin interlayer during the curing operation.

The present invention is based on the discovery that by employing films such as, for example, certain types of cellulose acetate films, which are affected by liquid resins or by atmospheric moisture, to encase the resin interlayer, there is provided an excess of film which crinkles as the interlayer is cured. The crinkles provide substantially uniform, solidified crinkled lines in the interlayer and thereby produce a highly decorative pattern or finish on the surface of the cured product. After the resin interlayer is cured, the films are stripped therefrom and a product having a highly decorative surface finish is provided.

The exact reasons why these selected films react in the foregoing manner are not presently known. One theory is that shrinkage of the resin interlayer occurs due to chemical reaction therein during curing. In addition, it appears that there might be a certain amount of elongation of the film during the curing operation. The elongation may be due to atmospheric moisture affecting the film or to the fact that certain chemical constituents of the liquid resin in the interlayer have a tendency to attack and partially dissolve the film, or to attack or partially dissolve the plasticizers used in the film to such an extent that the original flat form of the film is changed to an irregular form by the solvent action. This chemical attack is thought to stop shortly as the resin interlayer is cured since most components of thermosetting resins become chemically bonded and are rendered chemically inert when the resin is cured. However, the net result is that the cured resin product has an excess of film covering it which crinkles the resin during gelation. When the film is removed, the crinkled finish remains permanently on the product.

Accordingly, it is an object of the present invention to provide a method of forming a thermosetting resin product in which novel decorative effects may be produced in one or more of its surfaces by solidifying crinkles into the surfaces thereof during the curing operation.

It is another object of this invention to provide such a process in which the extent of crinkling may be controlled.

It is a further object of the present invention to provide a novel thermosetting resin product having a unique decorative crinkle finish thereon, which product may be translucent and may be tinted with suitable dyes or pigments.

In accordance with the present invention, a thermosetting resin in liquid state is placed upon a thin synthetic organic film which is appreciably affected either by moisture or by the thermosetting resin. A filler or reinforcement, such as random mat glass fibers, is then combined with the resin and a second similar film is placed on the combined resin and filler mix to form a wet lay-up. The film-encased assembly is thereafter transferred to an appropriately shaped mold and cured by heating in a well-known manner, to a hard, solid state.

During the curing stage, the thermosetting resin shrinks substantially and the film encasing the assembly, either because of chemical attack and/or the effect of moisture appears to expand. Accordingly, an excess of film is provided which crinkles in a surprisingly uniform manner, which crinkled film design is solidified into the surface of the resin interlayer upon gelation and curing thereof. If desired, the film may then be stripped from the cured resin. Or, it may at times be desirable to leave the films on the product for shipping protection. It will be obvious, of course, that films of other materials which do not produce the desired crinkled finish can be employed on one side of a panel, the crinkle finish being applied to the other side.

The thermosetting resins employed may include various thermosetting materials, such as the polyesters and polyester-styrene blends, alkyd resins, and variations of the synthetic thermosetting materials which may be made by one skilled in the art to produce a resin originally in a liquid state which is capable of polymerization to a hard, strong, and solid mass.

If desired, various catalysts may be used to aid in curing the resin, and for this purpose organic peroxide catalysts such as methyl ethyl ketone peroxide, benzoyl peroxide, tertiary butyl perbenzoate and the like are quite satisfactory. If desired, various promotors or accelerators known to the art, such as the mercaptans or cobalt naphthenate, may be used.

Films applicable to use in the present invention include those which are attacked by the liquid resin or by atmospheric moisture in a manner such that it loses its original flat form during gelation of the resin.

The preferred film material is cellulose acetate. One cellulose acetate film which has proved successful in the production of the present products is that manufactured and sold by the Celanese Corporation of America under the designation P-904. It has been found that thin films of this material are apparently subject to rapid chemical attack by the liquid resin and/or atmospheric moisture and appear to expand when employed in the present process. Since the resin interlayer contracts to a relatively great degree, the difference between the contraction of the resin and the apparent expansion of the cellulose acetate film creates an excess of film on the surface of the liquid resin interlayer which crinkles uniformly and thereby produces a highly decorative crinkled finish thereon which is retained when the resin is solidified.

It has been found that films of a thickness not exceeding about 0.05 inch can be employed in the present invention. Generally, however, films of a thickness in the range from about 0.0008 inch to about 0.0019 inch are employed for greatest economy of operation.

Thin films are easier to crinkle than thick films because they are more subject to atmospheric moisture or chemical attack or partial solution in a given period of time. Chemical attack or partial solution apparently causes a softening of the film accompanied by expansion or change in surface characteristics. The thicker the film, the longer the time the resin must be held in contact with the film in a liquid state at a given temperature for the crinkling process to occur. If the film is too thick for a given set of conditions of temperature and gel time, the film may not crinkle at all, while a thinner film under the same conditions will crinkle. Fig. 5 of the accompanying drawings shows that a certain acetate film of 0.0015 inch thickness produces a high frequency crinkle, whereas the same material in 0.005, 0.010 and 0.015 inch thicknesses shows no crinkling, but rather progressive stages of incipient crinkling.

Film composition also appears to be a factor which affects crinkling. Films of the same thickness but of different compositions exhibit differing degrees of or a substantial lack of crinkling under the same conditions, depending upon the type of plasticizer and other materials used in their manufacture. For example, a cellulose acetate film manufactured by the Celanese Corporation of America and designated commercially as L822M provides a medium crinkle when employed in a thickness of 0.010 inch. In contrast a cellulose acetate film manufactured by the Eastman Kodak Company produces only an incipient crinkle when used in the same thickness. The Kodak product produced only an incipient crinkle even at a thickness of 0.005 inch, under the same conditions as used in making a crinkle panel with the Celanese 0.010 inch product. A comparison of Figs. 4 and 5 of the accompanying drawings strikingly illustrates this difference of finish.

In the event the product is to be utilized for various structural elements and it is desired that the product be substantially translucent, a filler or reinforcement consisting essentially of glass in the form of fibers, floc, random mat, or woven cloth may be incorporated in the liquid resin. Such fillers are especially adapted to the present process and product by virtue of their relatively high strength-weight ratio. However, other reinforcing materials such as rayon, nylon, certain of the vegetable, synthetic or mineral fibers and the like may be used.

The products may be shaped and hardened in a well-known manner and for producing reinforced structural panels, it has been found that the use of a corrugated lower mold is satisfactory. An upper mold is not generally required, but if desired, an aluminum or other light weight cover sheet may be applied over the resin lay-up during the curing operation. Such a cover sheet serves a two-fold purpose. First, it helps distribute heat in a uniform manner to the resin interlayer when a heat source such as infra-red is applied to the wet lay-up to initiate curing. Once curing has been started, the resin produces exothermic heat of reaction. Then the cover plate helps to radiate the exothermic heat and stabilize the curing. When the gelling process takes place at a low humidity, the cover sheet protects the film from shrinkage by such a low humidity condition and allows the chemical action of the resin components to effect crinkling of the film.

Temperatures for curing the resin interlayer in the range from about 90° F. to about 275° F. will generally be satisfactory. Such curing temperatures are known in the art. Curing times from about 2 minutes to about 24 hours or longer may be employed. For commercial efficiency, cure times in the range from about 15 minutes to two hours are desirable.

Since the crinkling process is essentially one in which the film is affected in a chemical manner, it is necessary that the resin in contact with the film be in a liquid form for a time sufficient to produce a crinkle. Once the resin has been cured to a solid form, this chemical action of the resin on the film ceases. If the catalysts and/or accelerators used in the resin, and the temperature employed are such that gelation of the resin occurs too rapidly, insufficient time of liquid contact with the film may exist to produce a satisfactory crinkle. By either lowering the temperature or by lowering the catalyst-accelerator system to increase the gel time, a satisfactory crinkle can be produced.

Pressures may be used, but they must be limited in order to permit the desired amount and extent of crinkling of the acetate films. Pressures less than 2.0 pounds per square inch can be employed, with pressures in the range from 2 ounces per square foot to 0.5 pound per square inch being preferred. The amount of pressure may vary with the type of film utilized, the curing temperature, and the extent and character of the crinkled finish desired. If sufficient pressure is exerted against the films encasing the resin interlayer, it may be impossible to produce a crinkle. Accordingly, a substantially flat or smooth finish results. Under other conditions of excessive pressures, an inverse crinkle may result in which the smooth surface plane is higher than the crinkles, which are formed as valleys rather than ridges. The mechanism of crinkling is the same, but the excess film moves inward toward the resin layer instead of outward.

If desired, the products may be tinted with dyes or pigments of the relatively light-fast type which are not affected by the other components of the resin formulation.

Further, to illustrate the decorative finish provided by the present invention, reference may be had to the accompanying drawings, in which Fig. 1 is a perspective view of a reinforced synthetic resin panel made in accordance with the present invention;

Fig. 5 is a photolithographic reproduction of a series of panels made by using varying thicknesses of a cellulose acetate film manufactured by the Eastman Kodak Company.

Figure 1:
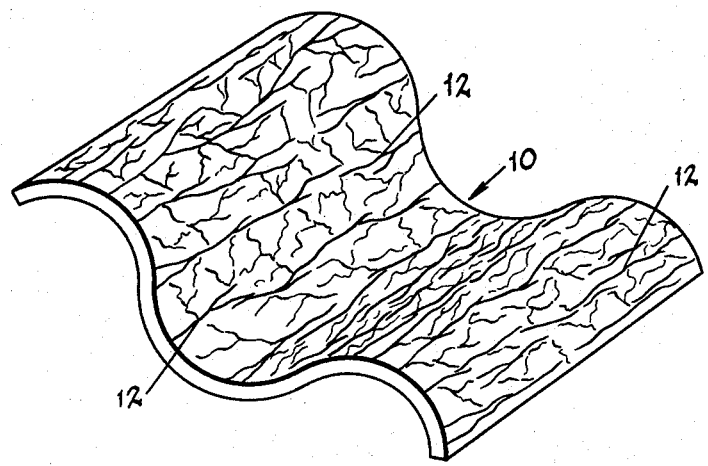
Figure 2:
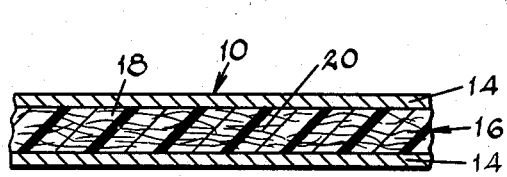
Fig. 2 is an enlarged cross-sectional view illustrating the manner of preparing the reinforced resin sheets for the curing step.

With reference to the drawings, the numeral 10 indicates a finished reinforced resin panel, which is here shown by way of example in corrugated form for structural applications, and the reference numeral 12 indicates the crinkles produced by the crinkling of the synthetic organic film 14 (see Fig. 2). In Fig. 1 the films 14 have been stripped from the finished panel 10.

As shown in Fig. 2, the resin interlayer 16, which comprises a thermosetting resinous mass 18 having a suitable filler 20 distributed therein, is placed between the synthetic organic films 14. As shown, the assembly is originally made up in flat form and is then transferred to an appropriately shaped mold for curing.

*Example I*

As a specific example of a production run of the present invention, a thin film of cellulose acetate of 0.001 inch thickness, manufactured by the Celanese Corporation of America and designated as P–904, was laid down on a table. A layer of polyester resin-styrene blend having a catalyst incorporated therein was then flowed onto the cellulose acetate film in a uniform layer approximately 1/16 of an inch in thickness. A random glass fiber mat was then incorporated into the resin layer. A second film of cellulose acetate was applied over the resin layer. The wet lay-up so formed was squeegeed to remove occluded air and was cut into appropriately shaped sections. The cut sections were transferred to aluminum molds and were covered with light weight aluminum cover or "caul" sheets of a configuration mating with that of the lower molds. The cover sheets exerted appropximately 0.3 pound per square foot of pressure to the upper surface of the lay-up. The resin was then cured at an elevated temperature, starting at 105° F. and continuing by increasing the temperature to 222° F. over a period of ½ hour.

Figure 4:
Fig. 4 is a photolithographic reproduction of a series of panels made by using varying thicknesses of cellulose acetate films manufactured by the Celanese Corporation of America.

After the curing operation was completed to provide a hardened product, the cellulose acetate films were stripped from the resin to disclose a highly decorative crinkled finish on each of the major surfaces of the cured resin, as illustrated in the photolithographic reproduction of Fig. 4 designated .001.

*Example II*

A run was made according to the procedure described in Example I except that a cellulose acetate film of .0015 inch thickness manufactured by the Eastman Kodak Company was employed. A product having a uniform and highly decorative crinkled finish on each of the major surfaces of the cured resin was produced, as illustrated in the photolithographic reproduction of Fig. 5, designated .0015. The crinkle was uniform but was of somewhat less frequency than that on the product produced in Example I.

*Example III*

A series of runs was made to demonstrate the effect of varying thicknesses of cellulose acetate films upon the finish, as follows:

A sheet of cellulose acetate of selected thickness was placed upon a smooth lay-up table and 280 grams of liquid polyester resin was placed thereon to provide a layer approximately 1/16 inch thick. The resin comprised a blend of 61 parts polyester resin with 39 parts styrene, and had 1.0 p.p.h. benzoyl peroxide, 0.5 p.p.h. methyl ethyl ketone peroxide dissolved in dibutyl phthalate and 0.003 p.p.h. cobalt naphthenate, as metal, incorporated therein. A reinforcement of random fiber glass mat of a weight of 2 ounces per square foot was then placed on the resin and incorporated therein. A second film of cellulose acetate equal in thickness to the first film was then placed upon the resin layer. The wet lay-up was squeegeed to remove occluded air and was then cured at an elevated temperature. Data for the series are included in summary form in the following table.

| Film | Film Thickness, Inches | Lay Up Temp., °F. | Initial Crinkle Temp., °F. | Cure Temp., °F. | Photolithograph Designation |
|---|---|---|---|---|---|
| Celanese, Cellulose Acetate P904. | 0.001 | 105 | 110 | 220 | C .001 |
| Do | 0.002 | 105 | 125 | 220 | C .002 |
| Celanese, Cellulose Acetate L822M. | 0.005 | 105 | 125 | 220 | C .005 |
| Do | 0.010 | 105 | 135 | 220 | C .010 |
| Eastman | 0.0015 | 105 | 110 | 220 | E .0015 |
| Do | 0.005 | 105 | 140 | 220 | E .005 |
| Do | 0.010 | 105 | 150 | 220 | E .010 |
| Do | 0.015 | 105 | | 220 | E .015 |

Comparative photographs were taken at equal (1½X) magnifications of the surface of each of the panels by employing reflected light. These photos were made into photolithographs and are reproduced in the accompanying Figs. 4 and 5. As strikingly shown, a film thickness of less than 0.002 inch produced a uniform crinkled finish. Film thicknesses of 0.002 inch and over when employing the Celanese film, produced crinkles, but of lesser frequency. Film thicknesses above .0015 inch produced only incipient crinkling when employing the Eastman film.

A careful examination of the surface of the products of the present invention represented by photolithographs designated C .001 and E .0015 reveals that the crinkle finish contains elevations in the order of magnitude of 0.003 inch up to about 0.06 inch, with an average in the range from about 0.01 to about 0.03 inch. Substantially all of these elevations are nearly pure resin with little or no reinforcement and comprise 10% or more of the total surface area. Observation of the finish of these products discloses that in the crinkle an excess of resin is drawn to the surface into peaks to cover the fibrous reinforcement. This would follow from the fact that the reinforcement, such as a glass fiber mat, is interlaced and felted, and being positioned generally in the center of the resin interlayer, cannot flow with resin which is drawn outwardly from the main body of resin. This condition is substantiated by the fact that the surface fibers of the reinforcement are virtually indistinguishable and visually undefinable in the crinkle panels. In panels with a relatively smooth finish the reinforcing fibers can usually be seen by reflected light as shown by E .005, E .010 and E .015 of Fig. 5.

The feature of excess resin covering the panel surfaces is highly desirable from the standpoint of weather resistance. The extra resin which is drawn up over the fibers in the crinkling process protects said fibers against the effects of sun, wind, rain and the like.

Figure 3:
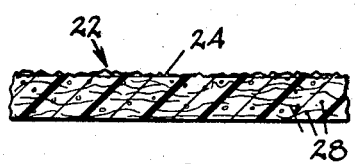
Fig. 3 is an enlarged section view of a panel having a crinkled finish and a fiber glass reinforcement.

By reference to Fig. 3 of the drawings, which represents a cross section of a panel 22 made according to the present invention, it will be seen that the resin rich surface 24 of the crinkled finish effectively covers the fibers 28 so that the fibers are buried deep within the panel under a resin rich, highly decorative, crinkled surface.

As used herein and in the claims the word "crinkle" may be defined as resin-rich elevations of an amplitude of .003" or more, substantially uniformly distributed in a random pattern over the entire surface so that the area of said elevations comprises more than 10% of the surface.

The invention herein disclosed is particularly adapted for use in connection with the production of reinforced thermosetting resin panels for use as structural materials, and accordingly, examples of this invention for the purpose of disclosure are directed toward that adaptation. However, it is to be understood that the foregoing detailed description is given merely by way of illustration for the purpose of the disclosure and that many variations may be made therein without departing from the spirit of the invention and the scope of the subjoined claims.

I claim:

1. The method of producing a substantially rigid thremosetting sheet product, which comprises providing a relatively thin flexible film of cellulose acetate which crinkles when brought into contact with a liquid thermosetting resin containing as its predominant portion a polyester resin of the alkyd type and which will adhere to the liquid resin but will not become bonded thereto upon curing of the resin, applying a relatively thicker layer of said resin in contact with said film while supporting the film for freedom of movement with respect to the resin, incorporating fibrous reinforcing material into the layer of resin from the uppermost surface thereof downwardly into the resin maintaining the liquid resin in contact with the film for a time sufficiently long to cause crinkling of the film and the drawing of the resin into peaks over the fibers and at a temperature sufficiently high to gel the resin while the film is in a crinkled state but not so high as to cause tension in the film which would remove the crinkles therefrom before the resin gels, the crinkled pattern of the film being imparted to the contacting surface of the layer of resin by the temporary adhesion between said film and resin during crinkling of said film, and then completing the curing of the resin.

2. The method of producing a substantially rigid thermosetting sheet product as claimed in claim 1, wherein the thickness of the cellulose acetate film is about 0.0002 to 0.005 inch.

3. The method of producing a substantially rigid thermosetting sheet product as claimed in claim 1, wherein glass fibers in mat form are incorporated in the liquid resin.

4. A method of producing a substantially rigid thermosetting resin product, comprising providing a relatively thin flexible film of a plastic which crinkles when brought into contact with a liquid thermosetting resin, applying a relatively thicker layer of said thermosetting resin to the film, incorporating fibrous reinforcement into the layer of resin from the uppermost surface thereof downwardly toward the film, and heating the fibrous reinforced layer of resin in contact with the film to cure said resin.

5. A method of producing a substantially rigid thermosetting resin product as defined in claim 4, wherein the fibrous reinforcement is in the form of a mat of glass fibers, and the mat of fibers is incorporated into the resin by first laying said mat onto the surface of the resin and then moving the mat into the resin.

References Cited in the file of this patent

UNITED STATES PATENTS

| | | |
|---|---|---|
| 1,377,509 | Novotny | May 10, 1921 |
| 2,428,654 | Collins | Oct. 7, 1947 |
| 2,440,039 | Brown | Apr. 20, 1948 |
| 2,485,798 | Whyte et al. | Oct. 25, 1949 |
| 2,500,728 | Williams | Mar. 14, 1950 |
| 2,517,698 | Muskat | Aug. 8, 1950 |
| 2,528,152 | Landgraf | Oct. 31, 1950 |
| 2,536,048 | Flanagan | Jan. 2, 1951 |
| 2,552,124 | Tallman | May 8, 1951 |
| 2,575,046 | Chavannes et al. | Nov. 13, 1951 |
| 2,748,028 | Richardson | May 29, 1956 |
| 2,784,763 | Shorts | Mar. 12, 1957 |
| 2,790,741 | Sonneborn et al. | Apr. 30, 1957 |